Nov. 25, 1941.  P. VAN SITTERT  2,263,709

CLUTCH DEVICE

Filed Dec. 11, 1939

INVENTOR
PAUL VAN SITTERT
BY
ATTORNEY

Patented Nov. 25, 1941

2,263,709

UNITED STATES PATENT OFFICE 2,263,709

CLUTCH DEVICE

Paul Van Sittert, Cleveland Heights, Ohio, assignor to The Cleveland Pneumatic Tool Company, Cleveland, Ohio, a corporation of Ohio Application December 11, 1939, Serial No. 308,545

6 Claims. (Cl. 192—56)

This invention relates broadly to improvements in clutches generally, but more particularly to a clutch mechanism adapted for use in portable power driven tools, such as used for setting screws, nuts, bolts or the like.

Heretofore such portable tools were equipped with a clutch mechanism including driving and driven members axially movable into or out of operative engagement. These members were equipped with cooperating rotation transmitting jaws, which were shaped and disposed in a manner calculated to effect automatic release of the clutch upon a predetermined resistance to rotation of the driven member. The axial movement of the driving or driven members resulting from the engagement or released motion of their appurtenant clutch jaws resulted in the transmission of reciprocatory motion to the entire portable tool, which motion together with the sudden torque to which the tool is subjected upon reengagement of its clutch members, was found to be very uncomfortable to the hand of the operator and making it difficult for him to hold the tool implement, carried by the tool, in operative engagement with the work.

It is therefore one object of this invention to produce a clutch mechanism wherein engagement or released motion of the clutch members does not transmit reciprocatory motion to the portable tool with which the mechanism is operatively associated.

Another object of this invention is to provide a portable tool of the type above mentioned with an improved clutch mechanism automatically maintained in released condition as long as the tool implement carried by the tool is not operatively engaging the work.

Another object of this invention is to produce an improved clutch mechanism of relatively simple construction, forming a compact assembly which is strong, durable and efficient.

Other objects and advantages more or less ancillary to the foregoing reside in the specific construction and aggroupment of the elements peculiar to this structure, as will become apparent from a more complete examination of this specification.

Figure 1:
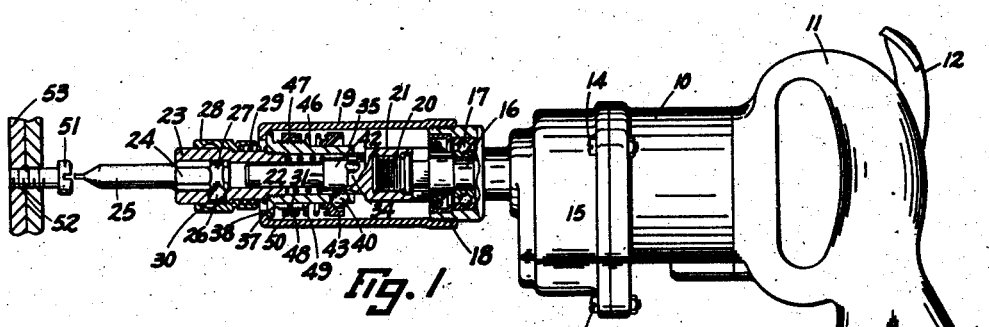
Fig. 1 is a side elevational view partly in section of a portable tool embodying the invention. In this view the tool implement is shown out of engagement with the work and the clutch in released position.

Referring to the drawing in which like symbols designate corresponding parts throughout the several views, 10 designates the cylinder of a fluid actuated rotary tool to which is attached a handle 11 having a throttle valve (not shown) accommodated therein and operable by a trigger 12, the motive fluid being admitted to the throttle valve through an adequate connection 13. Secured to the housing 10 by bolts 14, there is a front housing 15 within which is generally mounted a train of gears (not shown) for transmitting rotation to a spindle 16 journaled within one or more ball bearings 17, one of which is shown in Fig. 1 housed within the front housing 15, which housing has rigidly secured thereto by a screw threaded connection 18 a sleeve-like extension or front handle 19.

Figure 2:
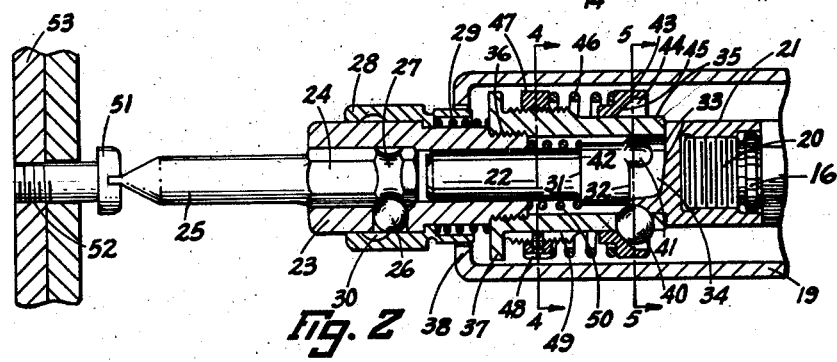
Fig. 2 is an enlarged longitudinal sectional view of the front end portion of the tool shown in section in Fig. 1, the tool implement being shown in operative engagement with the work and the clutch in operative position.
Figure 3:
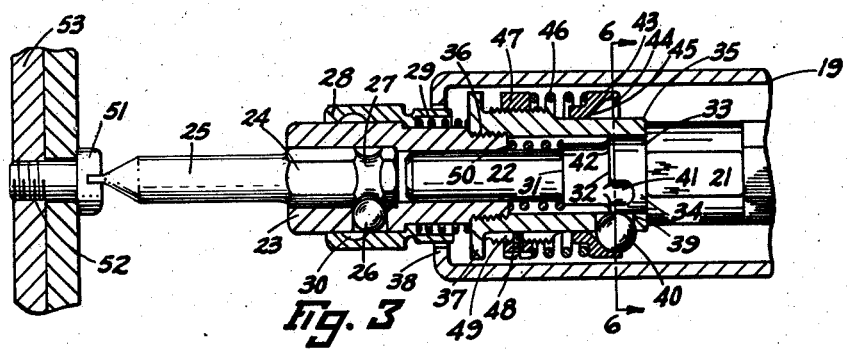
Fig. 3 is a view similar to Fig. 2 illustrating the clutch in a released position.
Figure 4:
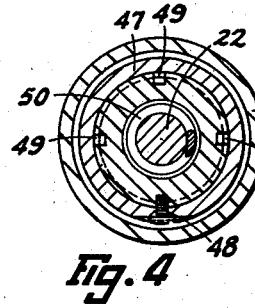
Fig. 4 is a cross sectional view taken in a plane indicated by line 4—4 in Fig. 2.
Figure 5:
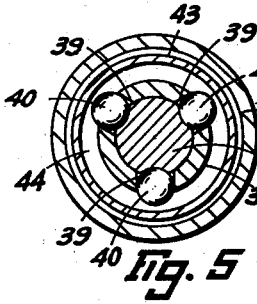
Fig. 5 is a cross sectional view taken in a plane indicated by line 5—5 in Fig. 2.
Figure 6:
Fig. 6 is a cross sectional view taken in a plane indicated by line 6—6 in Fig. 3.

Referring now more particularly to the invention, the rotary spindle 16 extends through the bearing 17 where it is terminated by a threaded shank 20 on which is screwed the internally threaded head 21 of an extension 22, which extension is therefore made to rotate with the spindle 16 and could, if desired, be made an integral part of the spindle. The extension 22 ends within the rear end portion of a socket member 23 adapted to receive the shank 24 of a tool implement represented in the drawing by a screw driver 25, which shank is mounted within the socket 23 against rotation relative thereto and is held in position by a detent or ball 26 radially carried by the socket and adapted to fit in an annular recess 27 formed in the shank 24. The ball 26 is held in operative position by the usual retaining sleeve 28 slidable on the socket 23 and maintained in operative engagement with the ball 26 by a compression spring 29, which spring may be compressed upon movement of the sleeve 28 toward the housing 19 for enabling the ball 26 to drop within an annular groove 30 provided in the sleeve, thereby enabling the removal of the tool implement from the socket member 23. The extension 22, which is formed of differential diameters, includes intermediate its ends three annular shoulders 31, 32 and 33, the latter being formed at the junction of the head 21 with a collar 34, on which collar is loosely fitted a driven member or sleeve 35 extending therefrom to the socket member 23 where it is secured thereto by a screw threaded connection 36. The outer end of the sleeve 35, or more specifically the end thereof adjacent the socket member 23 is formed with an external annular flange 37 engageable with the inturned end wall 38 of the front handle 19 for limiting slidable movement in one direction of the socket member 23 and consequently of the sleeve 35 on the extension 22. In the inner end portion of the sleeve 35, there is provided a plurality of equally spaced bores 39 extending radially therethrough, each bore having a ball or detent 40 slidable therein, the diameter of the detents being materially greater than the thickness of the sleeve 35 to enable projection of the detents inside and outside of the sleeve as clearly shown in Fig. 2. On the collar 34 of the extension 22, there is provided three equally spaced notches 41, the bottom of which is made flush with the adjacent corresponding portion 42 of the extension 22. In depth the notches 41 are made to receive only a small portion of the detents 40, thereby causing the side walls of the notches to normally exert a camming action on the detents tending to move the detents outwardly relative to the collar 34.

Axially slidable on the sleeve 35, there is a ring or cam member 43 formed with a counterbore 44, the bottom 45 of which is inwardly inclined and is engageable with the detents 40 for the purposes hereinafter explained. The ring 43 is constantly urged inwardly or in operative engagement with the detents 40 by a compression spring 46 resting on a nut 47 which is screwed on the outer end portion of the sleeve 35 and is held thereon against accidental rotation of a cap screw 48 extending into a longitudinal groove 49 provided in the threaded end portion of the sleeve 35.

The sleeve 35 which is slidable and rotatable relative to the extension 22 is constantly urged in end engagement of its flange 37 with the front handle's end wall 38 by a compression spring 50 interposed between the inner end of the socket member 23 and the shoulder 31 formed on the extension 22, while the inward slidable movement of the sleeve on the extension 22 is limited by the engagement of its inner end with the annular shoulder 33.

Before applying the tool implement to the work, which is represented in the drawing by a cap screw 51 operatively engaging the threaded bore 52 of a plate 53, the spring 50 active between the shoulder 31 and the inner end of the socket member 23 will hold the sleeve 35 in its furthermost position within the front handle 19, that is, in end engagement of its annular flange 37 with the end wall 38 of the front handle 19, in which instance, the detents 40 are longitudinally spaced from the notches 41 and made to engage the smooth cylindrical portion 42 of the extension 22, as clearly shown in Fig. 1, thereby enabling rotation of the spindle 20 and consequently of the extension 22 relative to the sleeve 35 and the socket member 23, and consequently enabling the tool implement 25 to remain stationary even though the trigger 12 is held in throttle valve open position resulting in the rotary motion of the extension 22.

When it is desired to impart rotation to the tool implement, a slight axial pressure may be exerted on the handle 11 to cause compression of the spring 50 and the consequential movement of the portable tool toward the work relative to the tool implement 25, socket 23 and sleeve 35, and resulting in the detents 40 to be moved into a vertical plane passing through the notches 41. In this instance, the detents 40 being urged inwardly by action of the inclined bottom wall 45 of the counterbore 44 of the ring 43, which ring is urged inwardly by a compression spring 46, causes the detents to drop into the notches 41 for transmitting rotation to the sleeve 35 and consequently to the socket 23 and to the implement 25.

After the screw is initially set, it tends to resist further rotation of the driven member or sleeve 35, thereby resulting in the outward movement of the detents 40 effected by the camming action of the side walls of the notches on the detents, which detents, by acting on the inclined wall 45 of the ring 43, will cause slidable movement of the ring 43 on the sleeve 35 against the efforts of the compression spring 46, in which instance, the spindle and extension 22 will be free to rotate relative to the sleeve 35 or tool implement 25. However, due to the constant camming action exerted by the ring 43 on the detents 40, as soon as the notches 41 are again positioned in radial alignment with the detents 40, the detents will again drop in the notches for again imparting rotation to the sleeve 35 and the tool implement 25. As long as the tool is pressed on the work, this in and out motion of the detents 40 relative to the notches 41 will continue, thus resulting in a ratchetlike sound indicating to the operator that the work is sufficiently set for him to remove the tool implement from the work while still holding the trigger 12 in throttle valve open position.

As the portable tool is removed from the work, the spring 50 active between the shoulder 31 and the inner end of the socket member 23 will again drive the sleeve 35 forwardly, causing the detent 40 to move longitudinally out of alignment with the notches 41 for preventing transmission of rotation between the extension 22 and the sleeve 35.

From the foregoing explanation, it will be understood that the automatic disengagement of the clutch or more specifically the outward movement of the detents 40 relative to the notches 41 is primarily controlled by the spring 46, the compression of which can be varied by changing the position of the nut 47 on the sleeve 35 by simply removing the cap screw 48 and rotating the nut in one or the other direction until the screw again comes into alignment with the groove 49, and thereafter again setting the screw to have it project into the groove for preventing axial rotation of the nut 47. While the in and out engagement of the clutch will cause a slight oscillatory motion of the handle 11, that motion can be readily resisted by the operator holding the handle 11, it being understood that the radial engagement and disengagement of the clutch does not transmit longitudinal vibrations to the tool, which vibrations heretofore have been found to fatigue the operator as well as making it difficult for him to maintain the tool implement 25 in operative engagement with the work.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a device of the character described, a pair of coaxially disposed members one surrounding the other, rotation transmitting means between said members including a notch on one of said members and a detent on the other member axially and radially movable into or out of operative engagement with said notch, spring means normally preventing axial movement of said notch into operative engagement with said detent but capable of deflection to enable said movement under certain conditions of operation, and means responsive to a predetermined resistance to rotation of one of said members for effecting radial movement of said detent out of operative engagement with said notch.

2. In a device of the character described, a pair of coaxially disposed members one surrounding the other and capable of limited relative axial movement, rotation transmitting means between said members including a notch on one of said members and a detent on the other axially and radially movable into or out of operative engagement with said notch, means including an axially movable cam element engaging said detent for normally preventing the radial movement of said detent out of operative position, and means effecting relative axial movement of said members in one direction under certain conditions of operation for causing the release of said rotation transmitting means irrespective of said cam element.

3. In a device of the character described, a pair of coaxially disposed members one surrounding the other and capable of limited relative axial movement, rotation transmitting clutch means between said members capable of release upon a predetermined torque resistance of one of said members or upon the relative axial movement of said members in one direction, means normally preventing the release of said clutch means by virtue of the torque resistance of one of said members, and means effecting said relative axial movement in said one direction under certain conditions of operation.

4. In a device of the character described, a pair of coaxially disposed members one surrounding the other and capable of limited relative axial movement, rotation transmitting clutch means between said members capable of release upon a predetermined torque resistance of one of said members or upon the relative axial movement of said members in one direction, cam means normally effecting operative engagement of said clutch means but enabling the release thereof upon the predetermined torque resistance of said one member, adjustable means for varying the extent of said torque resistance necessary for effecting said release, and means effecting said relative axial movement in said one direction under certain conditions of operation.

5. In a device of the character described, a driving spindle, a driven sleeve coaxially on said spindle, radially movable rotation transmitting clutch means between said spindle and sleeve capable of release to enable relative rotation therebetween, a cam slidable on said sleeve normally effecting operative engagement of said clutch means but enabling the release thereof upon a predetermined torque resistance of said sleeve, and adjustable means on said sleeve operatively associated with said cam for varying the extent of said torque resistance necessary for effecting said release.

6. In a device of the character described, a pair of coaxially disposed members capable of limited relative axial movement, rotation transmitting clutch means between said members capable of release upon a predetermined torque resistance of one of said members or upon the relative axial movement of said member in one direction, means normally preventing the release of said clutch means by virtue of the torque resistance of one of said members, and means effecting said relative axial movement in said one direction under certain conditions of operation.

PAUL VAN SITTERT.